United States Patent [19]
Wakahara

[11] Patent Number: 5,874,973
[45] Date of Patent: Feb. 23, 1999

[54] IMAGE FORMING APPARATUS THAT CONTROLS FLIGHT OF DEVELOPER PARTICLES AT THE START AND/OR END OF AN IMAGE FORMING OPERATION

[75] Inventor: Shirou Wakahara, Osaka, Japan

[73] Assignee: Sharp Kabushiki Kaisha, Osaka, Japan

[21] Appl. No.: 785,663

[22] Filed: Jan. 17, 1997

[30] Foreign Application Priority Data

Jan. 19, 1996 [JP] Japan .................................. 8-007383
Mar. 6, 1996 [JP] Japan .................................. 8-048852

[51] Int. Cl.$^6$ .............................. B41J 2/06; G01D 15/06
[52] U.S. Cl. ............................................................. 347/55
[58] Field of Search ................................................. 347/55

[56] References Cited

U.S. PATENT DOCUMENTS

| | | | |
|---|---|---|---|
| 5,329,307 | 7/1994 | Takemura et al. | 346/153.1 |
| 5,404,155 | 4/1995 | Kitamura | 347/55 X |
| 5,504,509 | 4/1996 | Kagayama | 347/55 |
| 5,614,932 | 3/1997 | Kagayama | 347/55 |

FOREIGN PATENT DOCUMENTS

| | | |
|---|---|---|
| 0 587 366 A1 | 3/1994 | European Pat. Off. . |
| 0 710 895 A1 | 5/1996 | European Pat. Off. . |
| 0 720 072 A2 | 7/1996 | European Pat. Off. . |
| 0 764 540 A2 | 3/1997 | European Pat. Off. . |
| 06155798 | 6/1994 | Japan . |
| 06-286204 | 10/1994 | Japan . |

*Primary Examiner*—Fred L Braun
*Attorney, Agent, or Firm*—David G. Conlin; William J. Daley, Jr.

[57] ABSTRACT

A voltage from a high voltage power source is applied between a toner support and an opposing electrode to generate an electric field between the two elements which permits the toner carried on the toner support to jump to the opposing electrode side. A control electrode is provided between the toner support and the opposing electrode to control the jumping of the toner. The control electrode is formed with annular electrodes around gates through which the toner passes through. In this arrangement, one or the combination of the followings are featured: At the initial stage of the recording start, the toner support is made to rotate so that the amount of static charge on the toner is stabilized. After the toner is stabilized, the control power source applies a voltage for prohibiting the toner from jumping, to the annular electrodes, then applies a high voltage to the opposing electrode. Thus, the toner can be prevented from erroneously jumping from the toner support.

6 Claims, 11 Drawing Sheets

IMAGE FORMING APPARATUS THAT CONTROLS FLIGHT OF DEVELOPER PARTICLES AT THE START AND/OR END OF AN IMAGE FORMING OPERATION

BACKGROUND OF THE INVENTION (1) Field of the Invention

The present invention relates to an image forming apparatus which directly forms the image on recording medium such as recording paper etc., by causing developer particles to jump thereto and can be applied to a printer unit in digital copiers and facsimile machines as well as to digital printers, plotters, etc.

(2) Description of the Prior Art

In recent years, as the image forming means for outputting a visual image on recording medium such as recording paper etc., in response to an image signal, an image forming apparatus is disclosed in Japanese Patent Application Laid-Open Hei 6 No.155,798, for example, in which developer particles, i.e., toner, are made to directly adhere to the recording medium to thereby form a toner image on it, directly.

Referring to FIGS. 1 and 2, a printer of the configuration represented by the image forming apparatus defined in Japanese Patent Application Laid-Open Hei 6 No.155,798 will be described. This apparatus includes an image forming unit 51 having a toner supplying section 52 and a printing section 53. In this apparatus, toner 71 carried in toner supplying section 52 is selectively made to jump to and adhere to a sheet-like recording paper 55 as a recording medium. During this operation, the jumping of toner 71 is controlled in accordance with an image signal so that the toner can selectively adhere to recording paper 55 directly, forming a visual image.

Toner supplying section 52 is composed of a toner reservoir 70 for holding toner 71 as developer particles which are, for example, negatively charged, and a toner support 72 for supporting toner 71 using, for example, magnetic force. Toner support 72 is grounded and rotationally driven in the direction indicated by arrow E in the figure, with its surface speed set at 30 mm/sec, for example. Toner 71 is of a magnetic type having a mean particle diameter of 10 $\mu$m, and is electrified with static charge of $-4$ $\mu$C/g to $-5$ $\mu$C/g by a well-known technique. Toner 71 is carried on the peripheral surface of toner support 72 with a mean thickness of about 80 $\mu$m.

As to these, referring first to the conventional apparatus configured as shown in FIG. 1, printing section 53 as a part of image forming unit 51 is composed of an opposing electrode 75 made up of an aluminum pipe of, for example, 50 mm in diameter, and a control electrode 76 which is provided between opposing electrode 75 and a toner support 72. Opposing electrode 75 is arranged about 1 mm apart from the peripheral surface of toner support 72, has a high voltage, e.g., 2 kV applied from a d.c. power source 80, and is rotationally driven in the direction of arrow F in FIG. 1, with its surface speed set at 30 mm/sec. Therefore, an electric field is generated between opposing electrode 75 and toner support 72 that causes toner 71 supported on toner support 72 to jump toward opposing electrode 75.

Control electrode 76 is disposed in parallel to a tangent plane of the surface of opposing electrode 75 and spreads two-dimensionally facing opposing electrode 75, and it has a structure which permits the toner to pass therethrough from toner support 72 to opposing electrode 75. The electric field formed between toner support 72 and opposing electrode 75 varies depending on the potential being applied to control electrode 76, so that the jumping of toner 71 from toner support 72 to opposing electrode 75 is controlled.

Control electrode 76 is arranged so that its distance from the peripheral surface of toner support 72 is set at 100 $\mu$m, for example. Control electrode 76 is composed of a flexible print board (FPC) 76a 50 $\mu$m thick and annular electrodes 77 . . . of a copper foil of 20 $\mu$m thick. Board 76a has gates 79 . . . having a diameter of 150 $\mu$m for passage of toner 71. Around these gates 79 . . . are arranged the aforementioned annular electrodes 77 . . . . Each annular electrode 77 is electrically connected via a feeder line and high-voltage driver (neither is unillustrated) to a control power source 81.

Voltages are applied to electrodes 77 . . . from control power source 81, corresponding to the image signal. Detailedly, when toner 71 supported on toner support 72 is made to travel toward opposing electrode 75, control power source 81 applies a voltage, e.g., 200 V to annular electrodes 77 . . . , so that toner 71 can jump through gates 79 of annular electrodes 77 to the recording paper on the opposing electrode side. In contrast, if the toner need not be passed, the power source 81 applies $-200$ V to annular electrode 77 to prohibit the toner on toner support 72 from jumping toward opposing electrode 75. In this way, the application of voltages to annular electrodes 77 is performed in accordance with the image signal, so that it is possible to directly form a visual image corresponding to the image signal, on the recording paper 55, by selectively causing the toner to jump.

Here, the rotation of toner support 72, the rotation of opposing electrode 75, the application of voltage to control electrode 76 to prohibit passage of toner 71, and application of the high voltage to the opposing electrode are activated at almost the same time by a common trigger. The transfer time of toner 71 from toner support 72 to recording paper 55 is determined depending upon the amount of static charge on the toner, the distance, and the potential difference applied, between toner support 72 and opposing electrode 75, and in particular, depends on the intensity of the electric field. This time is about 250 $\mu$sec, for example. The voltage application time to annular electrode 77 is set longer than the transfer time, specifically at about 300 $\mu$sec. Thus, the toner is ensured to adhere to recording paper 55 on opposing electrode 75.

Referring to the conventional apparatus configured as shown in FIG. 2, printing section 53 as a part of image forming unit 51 is composed of an opposing electrode 75 made up of aluminum of about 2 mm thick, and a control electrode 76 which is provided between opposing electrode 75 and toner support 72. Opposing electrode 75 is arranged about 1 mm apart from the peripheral surface of toner support 72 and has a high voltage, e.g., 2 kV applied from a d.c. power source 80. Therefore, an electric field generated between opposing electrode 75 and toner support 72 that causes toner 71 supported on toner support 72 to jump toward opposing electrode 75.

Arranged over opposing electrode 75 is a dielectric belt 73 in contact therewith so that the belt can travel. Dielectric belt 73 is formed endless and is tensioned by at least two support rollers 73a and 73b. When support roller 73b is made to operate, the belt travels in the direction of arrow F. In order for dielectric belt 73 to electrostatically attract recording paper 55 and convey it, a charge supplying roller 74, which abuts dielectric belt 73 with recording paper 55 in between, is arranged downstream with respect to the conveyed direction of recording paper 55. Further, a power source 82 is connected to charge supplying roller 74 in order to cause recording paper 55 to be attracted to dielectric belt 73 by imparting a predetermined amount of charge.

Control electrode 76 is disposed parallel to the tangent plane of the surface of opposing electrode 75 and spreads two-dimensionally facing opposing electrode 75, and it has a structure to permit the toner to flow therethrough from toner support 72 to opposing electrode 75. The electric field formed between toner support 72 and opposing electrode 75 varies depending on the potential being applied to control electrode 76, so that the jumping of toner 71 from toner support 72 to opposing electrode 75 is selectively controlled.

When a high voltage, e.g., 1 kV is applied to charge supplying roller 74 by power source 82, negative charges are injected into recording paper 55 because support roller 73a is applied with 2 kV as stated above. Accordingly, the paper is electrostatically attracted to, and adheres to, dielectric belt 73 so that it can be conveyed to printing section 53 with the travel speed of dielectric belt 73.

Other configurations and operations of the apparatus of FIG. 2 is the same as those of FIG. 1.

These conventional apparatuses suffer from the following problems.

First, in the image forming apparatus of FIG. 1, a high voltage begins to be applied to opposing electrode 73 simultaneously with the application of voltage to other electrodes and the start of rotation of toner support 72. In this case, after a prolonged passage of time has elapsed from the deactivation of the image forming apparatus, or when toner support 72 just starts rotating, the surface of toner support 72 does not have the desired amount of charge and also the thickness of the toner layer supported thereon is not uniform either, so that most toner 71 exhibits unstable performance.

In such an unstable condition, when a high voltage is applied to opposing electrode 75 in order to perform the image forming operation, some toner 71 starts to transfer from toner support 72 to opposing electrode 75 passing through gates 79 even if the voltage which does not cause toner 71 to jump is being applied. This causes the problems that the surface of opposing electrode 75 is stained with toner 71 and that the underside of recording paper 55 being conveyed is stained by the transferred toner on the opposing electrode.

Some of the unstable toner 71 may jump to control electrode 76 due to its potential difference relative to opposing electrode 75 even if a voltage (−200 V in the conventional configuration) not causing toner 71 to jump is applied to control electrode 76. In this way, the adherence of toner 71 to control electrode 76 causes the apparent potentials of annular electrodes 77 . . . to vary due to the electric charge on the toner thus adhering, causing difficulty in the normal passage control of toner. Further, gate 79 for passage of toner might be clogged due to the toner particles adhering to control electrode 76, causing printing to be disabled in the worst case.

Of the unstable toner 71, a considerable amount of toner is reversely charged or has opposite polarity to the desired polarity. If there is such reversely charged toner 71, it adheres to control electrode 76 even if a voltage which will not cause toner 71 to jump (−200 V in the conventional configuration) is being applied. When the reversely charged toner 71 adheres to control electrode 76, the apparent potential of annular electrode 77 varies due to the charge on toner 71 as stated above, thus making it difficult to perform normal toner control. Further, this may make gate 79 clog or cause other troubles, followed by printing deficiency in the worst case.

In the image forming apparatus of FIG. 2, the high voltages applied to control electrode 76 and to opposing electrode are shut off simultaneously as soon as toner support 72 is deactivated at the end of the image recording operation.

Here, since opposing electrode 75 and control electrode 76 stated above have high voltages applied, toner 71 carried on toner support 72 is affected by the electric field created by the high voltages even after the cutoff because of the decay time constant. Since, in particular, a higher voltage is applied to opposing electrode 75 than to control electrode 76, if the supply of voltage to opposing electrode 75 is shut off, the electric field which causes the toner to jump toward opposing electrode will continue to exist because of the decay time constant. Therefore, some of toner 71 carried on toner support starts to transfer toward opposing electrode 75 passing through gates 79.

For the above reason, at the end of image forming, unnecessary toner tends to jump and adhere to opposing electrode 75 thus staining opposing electrode 75 with the toner. In order to prevent such phenomena, if image forming is temporarily stopped, a voltage which prohibits the toner from jumping toward the control electrode or opposing electrode, etc., may be adapted to be applied constantly. However, the maintenance of this voltage during the non-operating state of image forming, only causes waste of energy. Therefore, when image forming finishes, supply of voltage to the electrodes is usually stopped in time with the end of operation.

If the supply of voltage to opposing electrode 75 as well as to control electrode 76 is stopped at the end of image forming, the toner jumps to opposing electrode as stated above, staining the electrode with toner. If the image forming operation is restarted in this condition, the underside of recording paper 55 delivered will be stained disadvantageously.

The supply of the high voltage to opposing electrode 75, in particular, power circuit 80 etc., is not one in which supply and cutoff of high voltage is controlled by means of a relay circuit etc., but one in which the cutoff operation is effected by deactivating the oscillation of the voltage generator, specifically, DC—DC converter etc., to stop the generation of high voltage itself. This feature lengthens the decay time constant further, thus promoting the aforementioned problem of transfer and adherence of unnecessary toner to opposing electrode 75 after the end of image forming.

Of toner 71, some goes to opposing electrode 75 and some adheres to control electrode 76. If the image forming operation is restarted in this condition, the toner 71 adhering to control electrode 76 causes the apparent potentials of annular electrodes 77 . . . to vary due to the charge carried on toner 71, thus making it difficult to perform normal passage control of toner. Further, gate 79 for passage of toner might be clogged due to the toner particles adhering to control electrode 76, causing printing to be disabled in the worst case.

Even though toner 71 does not block gates 79 of control electrode 76, it adheres to the periphery of the gates 79 to make their openings narrower. If the image forming operation is restarted in this condition, the toner adhering to the interior of gates 79 disturbs jumping toner 71 traveling along the desired transfer path so that the toner cannot reach the predetermined dot forming area on recording paper 55. If toner 71 passes through gate 79 but does not reach the predetermined area on recording paper 55, the toner becomes scattered causing fogginess. That is, not only is it impossible to form a normal image but also toner 71 arriving on recording paper 55 causes the image to become blurred, forming a dim image without contrast. This especially causes difficulty in reproducing a halftone image or color image.

Moreover, the image forming apparatus with toner 71 thus adhering to control electrode 76 and opposing electrode 75 at the end of the image forming operation, is often left as it is for a long period of time. For example, suppose that the machine is left until the next day after the end of the image forming operation. Since toner 71 has a property that it clumps more as it is left longer, it becomes difficult to remove the toner which has adhered to control electrode 76 and was left. Once this happened, it is impossible to remove toner 71 by electrostatic force; it is necessary to detach control electrode 76 from printing section 51 and clean and remove it by force using an air brush or a typical cleaning brush. This task is very troublesome, and further brings about difficulty in attachment and adjustment of it to printing section 51 after cleaning.

SUMMARY OF THE INVENTION

In view of what is discussed above, it is therefore an object of the present invention to solve the above drawbacks at the start or at the end of the image forming operation.

It is another object of the invention to perform such control that at the initial stage of the start of image forming, the toner can be prevented from jumping and adhering to the control electrode or to the opposing electrode side.

It is a further object of the invention to perform such control that at the end of image forming, the toner can be prevented from jumping and adhering to the control electrode or to the opposing electrode side.

In order to attain the above objects of the invention, an image forming apparatus in accordance with the first aspect of the invention includes: a supporting means for supporting developer particles and imparting desired characteristics to the developer particles; an opposing electrode disposed facing the supporting means; a control electrode disposed between the supporting means and the opposing electrode and having a plurality of gates which form passage for the developer particles; and a controlling means which generates a predetermined potential difference between the supporting means and the opposing electrode and, by varying the potential applied to the control-electrode, controls passage of the gates for the developer particles forming the image.

Wherein at the start of the image forming operation, the controlling means suspends the application of a voltage to at least the control electrode until the developer particles carried on the supporting means for supporting the developer particles become imparted with desired characteristics, and applies a voltage for prohibiting the developer particles carried on the supporting means from jumping to the control electrode, only after the desired characteristics are given to the developer.

An image forming apparatus in accordance with the second aspect of the invention, includes: a supporting means for supporting developer particles and imparting desired characteristics to the developer particles; an opposing electrode disposed facing the supporting means; a control electrode disposed between the supporting means and the opposing electrode and having a plurality of gates which form passage for the developer particles; and a controlling means which generates a predetermined potential difference between the supporting means and the opposing electrode and, by varying the potential applied to the control electrode, controls passage of the gates for the developer particles forming the image on the recording medium conveyed along the top face of the opposing electrode.

Wherein the image forming operation onto the recording medium is started in such a manner that, at the start of the image forming operation, the controlling means, after it applies a voltage for prohibiting the developer particles carried on the supporting means from jumping, to the control electrode, applies a high voltage to the opposing electrode, then applies voltages in accordance with the image signal, to the control electrode.

An image forming apparatus in accordance with the third aspect of the invention, includes: a supporting means for supporting developer particles and imparting desired characteristics to the developer particles; an opposing electrode disposed facing the supporting means; a control electrode disposed between the supporting means and the opposing electrode and having a plurality of gates which form passage for the developer particles; and a controlling means which generates a predetermined potential difference between the supporting means and the opposing electrode and, by varying the potential applied to the control electrode, controls passage of the gates for the developer particles forming the image on the recording medium conveyed along the top face of the opposing electrode.

Wherein at the start of the image forming operation, the controlling means suspends the application of a voltage to the control electrode until the developer particles carried on the supporting means for supporting the developer particles become imparted with desired characteristics, and applies a voltage for prohibiting the developer particles carried on the supporting means from jumping to the control electrode, only after the desired characteristics are given to the developer, thereafter applies a high voltage to the opposing electrode, then applies voltages in accordance with the image signal, to the control electrode.

In accordance with the image forming apparatus thus configured, before image forming onto the recording sheet as a recording medium, the developer particles, e.g., toner, are stabilized first by rotating the toner support carrying the toner. For example, the amount of static charge is stabilized. In this condition, by applying a voltage for prohibiting the toner from jumping to the control electrode, the stabilized toner is inhibited from jumping from the toner support to the control electrode side. Further, even if after the application of the voltage for prohibiting the toner from jumping, to the control electrode, the predetermined high voltage is applied to the opposing electrode so as to generate a strong electric field for causing the toner to jump, between the toner support and the opposing electrode, no toner will transfer from the toner support to opposing electrode side through the control electrode because the electric field for prohibiting the toner from jumping is generated at the control electrode.

Accordingly, since no toner will transfer and adhere to the control electrode or opposing electrode at the initial stage of the start of image forming, if the control voltage in accordance with the image signal is applied to create an image, the image can be formed onto the recording sheet in a proper manner. Specifically, in order to cause the toner on the toner support to jump, gates as openings for passage of the toner are formed on the control electrode, with an electrode formed around each gate for supplying voltage. Since no toner jumps or adheres to the electrode, the gate will not become clogged with toner or the voltage supplied will not vary either. Therefore, it is possible to cause the toner to reliably transfer toward the opposing electrode at the time of image forming onto the recording paper. Thus, it is possible to create a normal image on the recording paper without its quality of image degraded.

In accordance with the image forming apparatus of the fourth aspect of the invention to attain the foregoing objects, an image forming apparatus includes: a supporting means for supporting developer particles and imparting desired characteristics to the developer particles; an opposing electrode disposed facing the supporting means; a control electrode disposed between the supporting means and the opposing electrode and having a plurality of gates which form passage for the developer particles; and a controlling means which generates a predetermined potential difference between the supporting means and the opposing electrode and, by varying the potential applied to the control electrode, controls passage of the gates for the developer particles forming the image.

Wherein at the end of the image forming operation, before the controlling means cancels the conditions on which the developer particles are prohibited from jumping in the developing region, the speed at which the supporting means or the developer particles are moved is set to be zero.

According to this configuration, after the end of image forming, attractive force acting on the developer particles to the developer support is generated or enhanced. Consequently, it is possible to prevent the developer particles from transferring to the control electrode and to the opposing electrode side. In particular, after the end of the image forming, it is no longer necessary to supply the voltage for maintaining the toner at the non-jump condition, the power consumption can be reduced.

According to the fifth feature, it is more effective that in the image forming apparatus having the fourth feature, the controlling means, after the moving speed imparted to the supporting means or the developer particles has been set at zero, cancels the jump electric field generated between the supporting means and the opposing electrode. Illustratively, the opposing electrode has a high voltage applied, to generate the electric field for causing the developer particles to jump, and if the supply of the high voltage is shut off, the opposing electrode will not fall down to the ground potential level, immediately because of the decay time constant. Even in such conditions, since the developer particles are attracted by the retaining force to the developer support, no unwanted developer particles will jump.

According to the sixth feature, in the image forming apparatus having the fifth feature, the controlling means, after the jump electric field generated between the supporting means and the opposing electrode has been canceled, finally cancels the voltage imparted to the control electrode. In this way, since the supplying of voltage to the opposing electrode is canceled while the developer particles being inhibited from jumping, it is possible to effectively prevent unwanted developer from jumping.

DESCRIPTION OF THE PREFERRED EMBODIMENTS

Embodiments of the invention will be described in detail with reference to the accompanying drawings.

Figure 1:
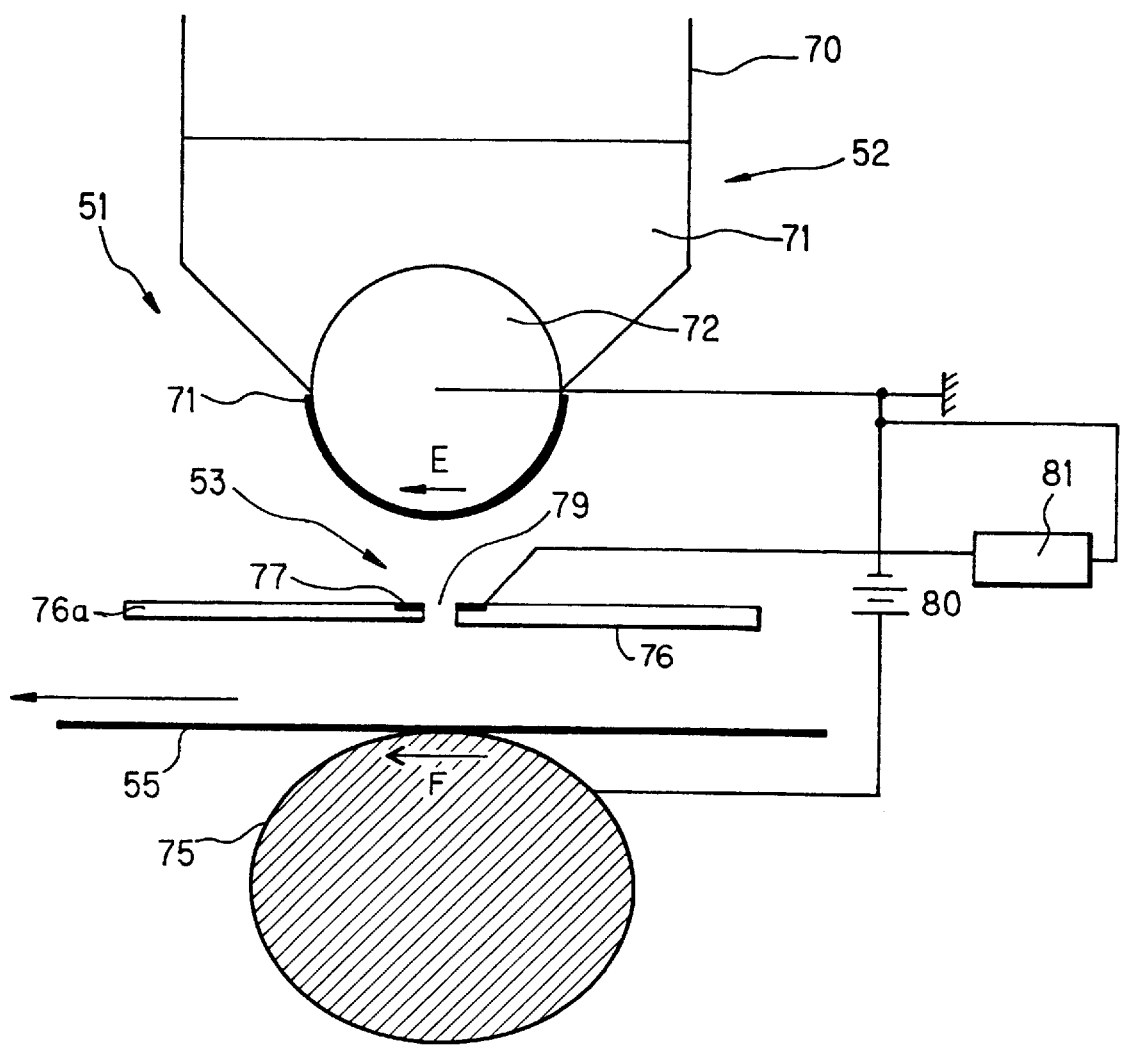
FIG. 1 is a sectional view for illustrating the principle of image forming of a conventional image forming apparatus
Figure 2:
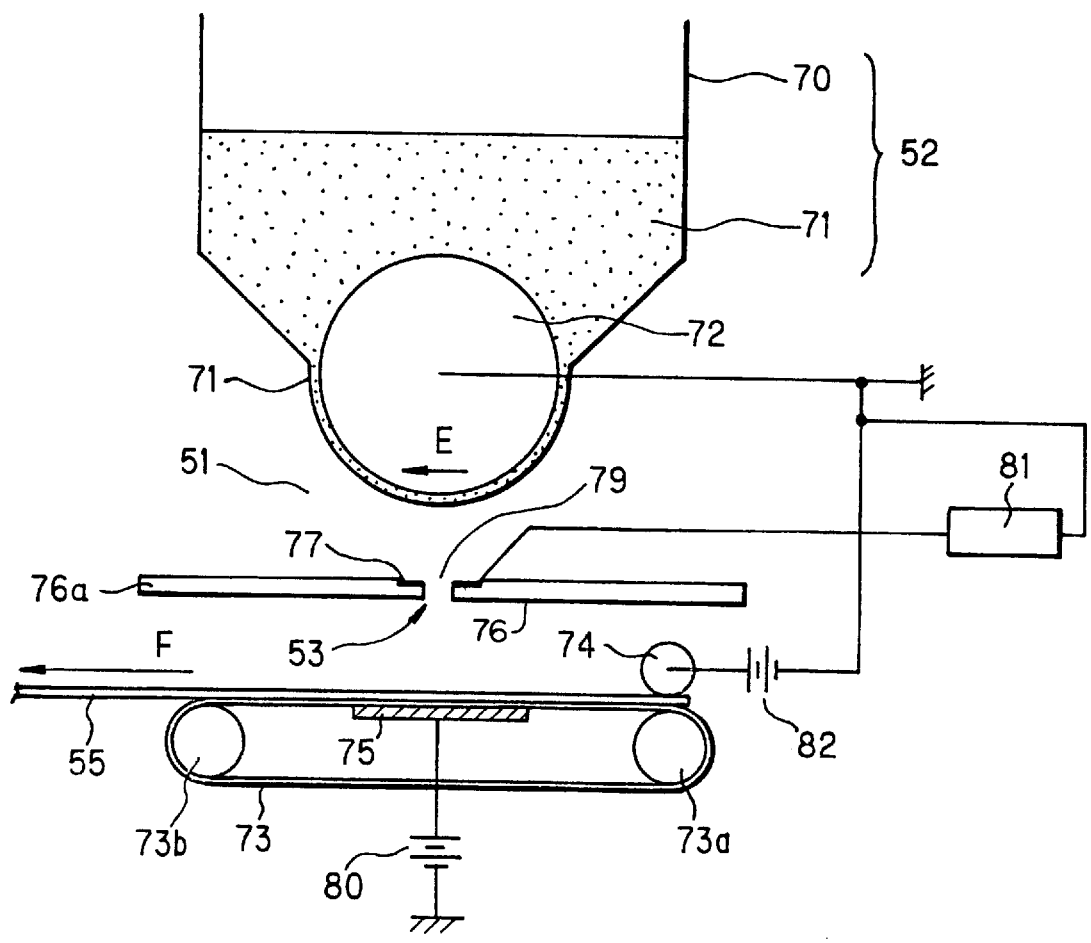
FIG. 2 is a sectional view for illustrating the principle of image forming of another conventional image forming apparatus.
Figure 3:
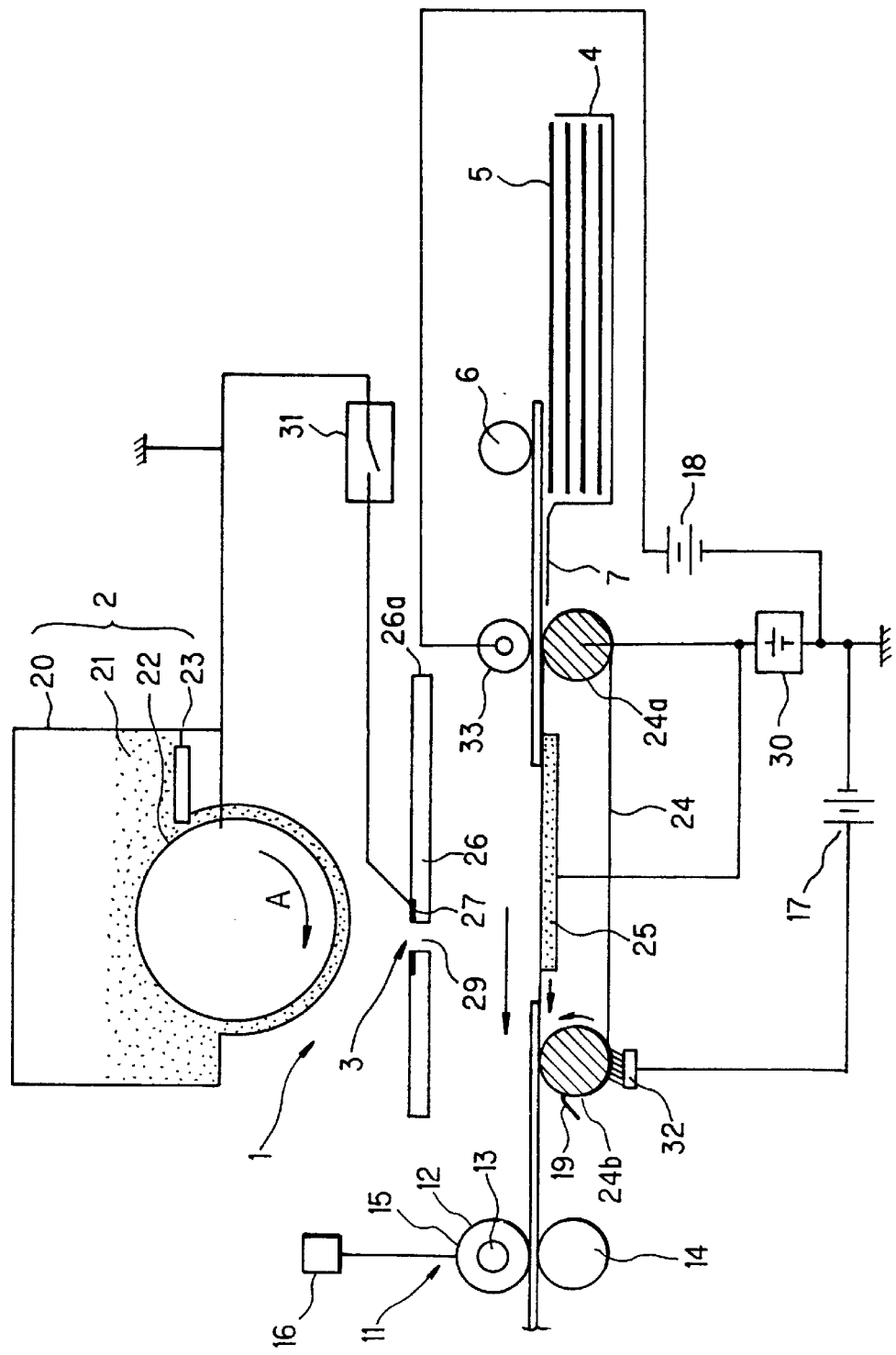
FIG. 3 is a schematic sectional view showing the overall configuration of an image forming apparatus of the invention.

FIG. 3 is a schematic sectional view showing the overall configuration of an image forming apparatus of the invention. In FIG. 3, the image forming apparatus of the invention has an image forming unit 1 which is composed of a toner supplying section 2 and a printing section 3. Image forming unit 1 creates a visual image in accordance with an image signal, onto recording paper as recording medium with toner as developer particles. In this image forming apparatus, the toner is selectively made to jump and adhere onto recording paper 5, and the jumping of the toner is controlled based on the image forming signal, so as to directly create the image on recording paper 5.

A paper feeder 10 is provided on the side of image forming apparatus 1 to which recording paper 5 is fed. Paper feeder 10 is composed of a paper cassette 4 for storing recording paper 5 as recording medium, a pickup roller (feed roller) 6 for delivering recording paper 5 sheet by sheet from paper cassette 4, and a paper guide 7 for guiding recording paper 5 sent out. Paper feeder 10 further has unillustrated detecting sensors for detecting the feed of recording paper 5, at positions in the path of paper feeding. Pickup roller 6 is rotationally driven by means of an unillustrated driver.

Provided on the output side of image forming apparatus 1 from which recording paper 5 is outputted, is a fixing unit 11 for heating and pressurizing the toner image which was formed on recording paper 5 at the image forming unit 1, to fix it onto recording paper 5. Fixing unit 11 is composed of a heat roller 12, a heater 13, a pressure roller 14, a temperature sensor 15, and a temperature controller circuit 16. Heat roller 12 is made up of, for example, an aluminum pipe 2 mm thick with a coating such as fluororesin, etc., which has a good separation performance with respect to the toner. Heater 13 is a halogen lamp, for example, which is incorporated in heat roller 12.

Pressure roller 14 is a pipe made up of, for example, aluminum etc., with its surface coated with silicone resin. Heat roller 12 and pressure roller 14 which are arranged opposite to each other, are pressed against one another in order to hold recording paper 5 in between and pressurize it, with a pressurizing load, e.g. 2 kg, from unillustrated springs etc., provided at both ends of their shafts.

Temperature sensor 15 measures the surface temperature of the heat roller 12. Temperature controller circuit 16 is controlled by a main controller, which will be described later, and performs the on/off operation of heater 13 or other control based on the measurement of temperature sensor 15, thus maintaining the surface temperature of heater roller 12 at, for example, 150° C.

Fixing unit 11 has an unillustrated paper discharge sensor for detecting the discharge of recording paper 5 processed through fixing unit 11. The materials of heat roller 12, heater 13, pressure roller 14, etc., are not specifically limited. The surface temperature of heat roller 12 also is not specifically limited. Further, fixing unit 11 may use a fixing process in which the toner image is pressed and fixed onto recording paper, instead of the heating and fixing process.

Further, although it is not shown in the drawing, the paper output side of fixing unit 11 has a paper discharge roller for discharging recording paper 5 processed through fixing unit 11 onto a paper output tray and a paper output tray for holding recording paper 5 thus discharged. The aforementioned heat roller 12, pressure roller 14 and paper discharge roller are rotated by an unillustrated driving means so as to discharge recording paper 5.

Toner supplying section 2 as part of image forming apparatus 1 is composed of a toner storage tank 20 for storing toner 21 as developer particles, a toner support 22 of a cylindrical sleeve for magnetically supporting toner 21, a doctor blade 23 which is provided inside toner storage tank 20 to electrify toner 21 and regulate the thickness of the toner layer carried on the peripheral surface of toner support 22.

Doctor blade 23 is arranged on the upstream side of toner support 22 with respect to the rotational direction and spaced with a distance of about 60 $\mu$m, for example, from the peripheral surface of toner support 22. Toner 21 is of a magnetic type having a mean particle diameter of, for example, 6 $\mu$m, and is electrified with static charge of −4 $\mu$C/g to −5 $\mu$C/g by doctor blade 23. Here, the distance between doctor blade 23 and toner support 22 is not particularly limited, and is specified appropriately in association with the amount of toner to be conveyed. The mean particle size, the amount of static charge, etc., of toner 21 are not particularly limited, but can be specified as necessary. Toner support 22 is rotationally driven by an unillustrated driving means in the direction indicated by arrow A in the figure, with its surface speed set at about 30 mm/sec, for example.

Toner support 22 is grounded and has unillustrated fixed magnets therein, at the position opposite doctor blade 23 and at the position opposite a control electrode (which will be described later). This arrangement permits toner support 22 to carry toner 21 on its peripheral surface, and as the sleeve of toner support 22 rotates, toner being magnetically attracted to (supported by) the sleeve can be conveyed. Toner 21 supported on the peripheral surface of toner support 22 is made to stand up in 'spikes' at the areas on the peripheral surface corresponding the positions of the magnetic poles of the aforementioned affixed magnets. Rotating speed of toner support 22 is not limited particularly, and may be determined based on the amount of the toner to be conveyed, etc. Here, the toner is supported by magnetic force, but toner support 22 can be configured so as to support toner 21 by electric force or combination of electric and magnetic forces.

Printing section 3 in image forming apparatus 1 includes: an opposing electrode 25 which is made up of an aluminum sheet of, for example, 1 mm in thick and faces the peripheral surface of toner support 22; a high-voltage power source 30 for supplying a high voltage to opposing electrode 25; a control electrode 26 provided between opposing electrode 25 and toner support 22; a charge eraser brush 32; a charge eraser power source 17 for applying a charge eraser voltage to charge eraser brush 32; a charging means 33 for charging recording sheet 5; a charger power source 18 for supplying a charger voltage to charging means 33; a dielectric belt 24; a pair of support rollers 24a and 24b for supporting and driving dielectric belt 24; and a cleaner blade 19.

Opposing electrode 25 is arranged about 1 mm apart from the peripheral surface of toner support 22. Here, charging means 33 may be in the form of a charging brush or charger roller.

Dielectric belt 24 which is driven in contact with opposing electrode 25 and conveys recording paper 5, is of an endless type about 75 $\mu$m thick, made of poly(vinylidene fluoride) (PVDF) as a base material, with a volume resistivity of about $10^{10}\Omega$.cm. Dielectric belt 24 is tensioned between support rollers 24a and 24b, and is rotated by an unillustrated driving means through a support roller, e.g., 24b, in the direction of the arrow in the drawing, at a surface speed of, for example, 30 mm/sec.

A high voltage, e.g., 2–2.3 kV, is applied to opposing electrode 25 from high voltage power source (controlling means) 30. This high voltage supplied from high voltage power source 30 generates an electric field between opposing electrode 25 and toner support 22, required for causing toner 21 being supported on toner support 22 to jump toward opposing electrode 25.

When a charging roller is used as the charging means, the charging roller is preferably made up of foam-rubber, e.g., urethane based foam-rubber of JIS-A30°, having a resistivity of $10^8\Omega$.cm. This charging means 33 is applied with a high voltage, e.g., 1.2 kV from power source 18 so that recording paper 5 may be negatively charged to be electrostatically attracted to dielectric belt 24. Thus, the paper can be conveyed in conformity with the traveling speed of dielectric belt 24.

Charge eraser brush 32 is pressed against dielectric belt 24 at a position downstream, relative to the rotational direction of dielectric belt 24, and of the area facing control electrode 26. Charge eraser brush 32 has an eraser potential of 2.3–2.5 kV applied from charge eraser power source 17 so as to eliminate unnecessary charges on the surface of dielectric belt 24.

If some toner 21 adheres to the surface of dielectric belt 24 due to a contingency such as paper jam, etc., cleaning blade 19 removes this toner 21 to prevent staining by toner 21 on the paper underside. The material of opposing electrode 25 is not particularly limited, and it can be formed of an appropriate material meeting the requirements. The distance between opposing electrode 25 and toner support 22 is not particularly specified either, and can be set appropriately. Further, the rotational speed of opposing electrode 25 or the voltage to be applied thereto is not limited either, and can be set appropriately in conformity with the toner and speed used.

Although not illustrated or unillustrated, the image forming apparatus includes: a main controller as a control circuit for controlling the whole image forming apparatus; an image processor for converting the image data obtained from image pickup device for reading an original image etc., into a format of image data to be printed; an image memory for storage of the image data; and an image forming control unit for converting the image data obtained from the image processor into the image data to be given to control electrode 26.

For effecting the above operation, control electrode 26 is disposed in parallel to the tangent plane of the surface of opposing electrode 25 and spreads two-dimensionally facing opposing electrode 25, and it has a structure to permit the toner to pass therethrough from toner support 22 to opposing electrode 25. The electric field formed between toner support 22 and opposing electrode 25 varies depending on the potential being applied to control electrode 26, so that the jumping of toner 21 from toner support 22 to opposing electrode 25 is selectively controlled.

Control electrode 26 is arranged so that its distance from the peripheral surface of toner support 22 is set at 100 μm, for example, and is secured by means of an unillustrated supporter member. As shown in detail in FIG. 4, control electrode 26 is composed of an insulative board 26a, a high voltage driver (not shown), annular conductors independent of one another, i.e., annular electrodes 27 . . . . Board 26a is made from a polyimide resin, for example, with a thickness of 25 μm. The board further has holes forming gates 29 . . . , to be mentioned later, formed therein. Annular electrodes 27 . . . are formed of copper foil, for instance, and are arranged around individual holes 29 in a predetermined manner on the surface which faces toner support 22 of board 26a. Each annular electrode 27 is formed 220 μm in diameter and 30 μm thick, for example. Each opening 29 of annular electrode 27 is set at 200 μm in diameter, for example, forming a passage for toner 21 to jump from toner support 22 to opposing electrode 25. This passage will be termed gate 29. Here, the distance between control electrode 26 and toner support 22 is not specifically limited.

The size of gates 29 . . . and the materials and thickness of board 26a and annular electrodes are not particularly limited. In the above case, gates 29 . . . , or annular electrodes 27 . . . are formed at 2,560 sites. Each annular electrode 27 is electrically connected to a control power source 31 (to be described later) via individual feeder lines 28 and a high voltage driver (not shown). The number of electrodes corresponds to a resolution of 300 DPI (dot per inch) across the width of A4 sized paper, forming one line of the image.

Here, the number of annular electrodes 27 . . . is not particularly limited. The surface of annular electrodes 27 . . . as well as the surface of feeder lines 28 is coated with an insulative layer (not shown) as thick as 30 μm, thus ensuring insulation between annular electrodes 27 . . . , insulation between feeder lines 28 . . . , and insulation between annular electrodes 27 . . . and feeder lines 28 . . . . The material, thickness etc., of this insulative layer are not particularly limited.

Voltages or pulses are supplied to annular electrodes 27 . . . of control electrode 26 in accordance with the image signal from control power source (controlling means) 31. Specifically, when toner 21 carried on toner support 22 is made to pass toward opposing electrode 25, a voltage, e.g., 150 V is applied to annular electrodes 27 . . . . When the toner is blocked to pass, a voltage, e.g., –200 V is applied.

In this way, whilst the voltage (potential) to be imparted to control electrode 26 is controlled in accordance with the image signal, a recording paper 5 is fed along opposing electrode 25 on the side thereof facing toner support 22. Thus, a toner image is formed on the surface of recording paper 5 in accordance with the image signal. Here, control power source 31 is controlled by a control electrode controlling signal transmitted from an unillustrated image forming control unit.

Figure 5:
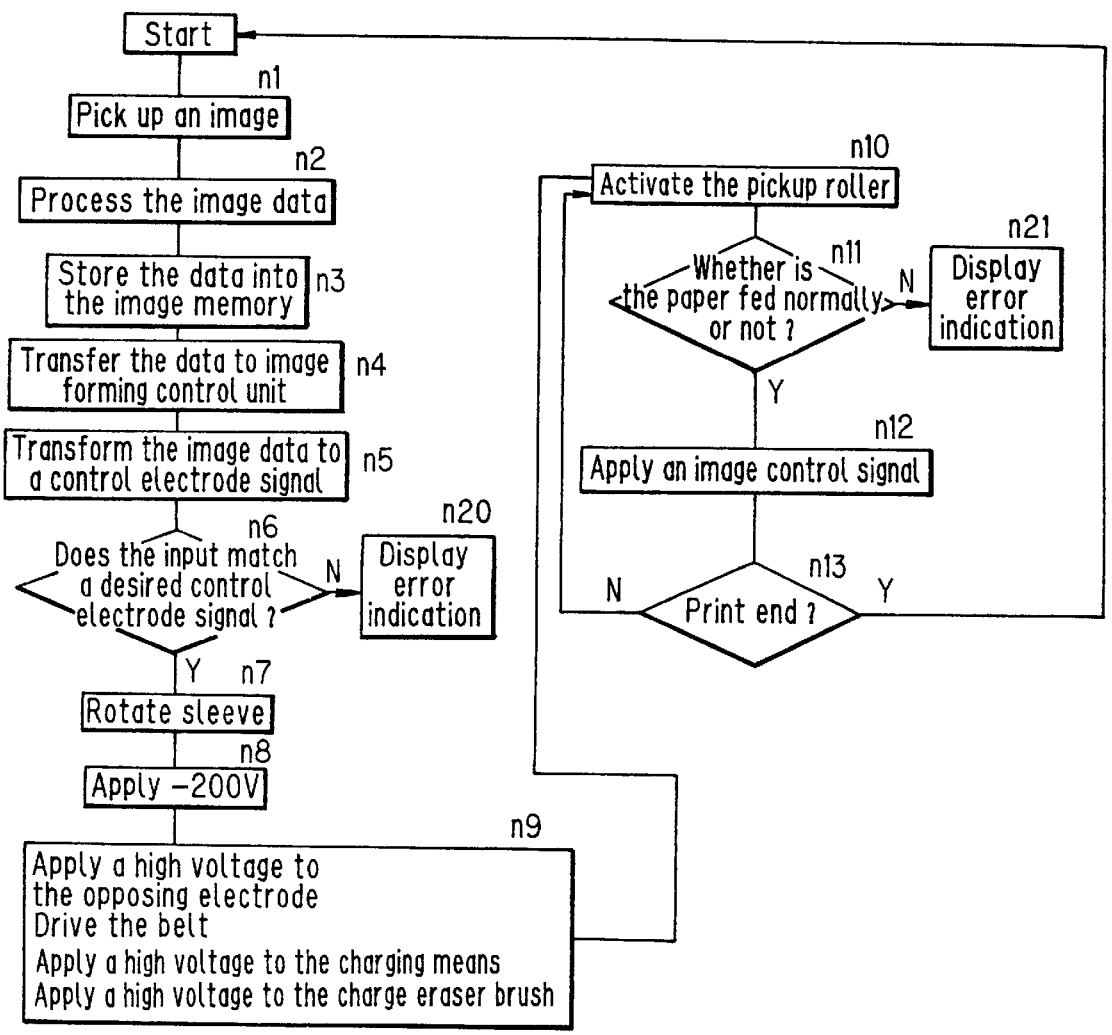
FIG. 5 is a flowchart showing the flow of an image forming control operation in the image forming apparatus of the invention.

Next, the image forming control in the image forming operation performed by this image forming apparatus will be explained with reference to the control flow shown in FIG. 5.

First, when the copy start key (not shown) is operated with an original to be copied set on the image pickup section, the main controller receives this input and starts the image forming operation. Illustratively, the image pickup section reads the original image (Step n1), and the image data is processed in the image processing section (Step n2) to be stored into the image memory (Step n3). As the image data stored in this image memory is transferred to the image forming control unit (Step n4), it starts to transform the input image data into a control electrode controlling signal to be imparted to control electrode 26 (Step n5). When the image forming control unit acquires a predetermined amount of the control signal to be supplied to the control electrode, toner support 22 starts to rotate (Step n7), while a voltage equal to opposing electrode 25 is applied to support roller 24a from high voltage power source 30 (Step n9). Charging means 33 is applied with a charging potential of 1.2 kV from charger power source 18 while charge eraser brush 32 is applied with an erasing potential from charge eraser power source 17 (Step n9).

Here, when the input does not match a desired control electrode signal, this flow is interrupted at Step n6, and an error indication is displayed (Step n20). When the input is confirmed to be the desired one, and the image forming control unit has acquired, as stated above, a predetermined amount of the control signal to be supplied to the control electrode, predetermined high voltages are applied to opposing electrode 25, charging means 33 and charge eraser brush 32 while –200 V, a potential for prohibiting the toner from jumping is applied to all the annular electrodes 27 . . . of control electrode 26 (Step n8), to prevent the jumping of toner 21 from toner support 22.

Thereafter, an unillustrated driver is activated to rotate pickup roller 6, which delivers a sheet of recording paper 5 out from paper cassette 4 toward image forming unit 1 (Step n10). At that moment, at Step n11, it is judged whether the paper is fed normally or not. Specifically, when recording paper 5 fed is detected by the sensor in the conveying path, the operation is judged as normal, followed by Step n12.

Here, recording paper 5 delivered out by pickup roller 6 is conveyed between charging means 33 and support roller 24a. Recording paper 5 is supplied with charges due to the potential difference between charging means 33 and support roller 24a. Electrostatically attracted to dielectric belt 24, recording paper 5 is conveyed with the advance of the belt, to a position in printing section 3 of image forming unit 1, where dielectric belt 24 faces toner support 22. The aforementioned predetermined amount of the control electrode controlling signal varies depending on the image forming apparatus used and other factors.

At Step n12, the image forming control unit supplies the control electrode controlling signal to control power source 31. This control electrode controlling signal is supplied at a time synchronized with the supply of recording paper 5 from charging means 33 to printing section 3. Control power source 31 controls the voltages to be applied to annular electrodes 27 of control electrode 26 based on the control electrode controlling signal. Illustratively, the voltage, 150 V or −200 V is appropriately applied to each or predetermined annular electrodes 27 from control power source 31 so as to control the electric field around control electrode 26. Accordingly, at each gate 29 of control electrode 26, the jumping of toner 21 from toner support 22 toward opposing electrode 25 is prevented or permitted appropriately in accordance with the image data. Thus, a toner image in conformity with the image signal is formed on recording paper 5 which is moving at the rate of 30 mm/sec toward the paper output side by the advance of dielectric belt 24. Here, in this invention, when the end of the image forming operation at Step n13 is confirmed, the control for ending the operation is effected (not shown). This control will be explained in detail hereinbelow.

Recording paper 5 with the toner image formed thereon is separated from dielectric belt 24 by the curvature of support roller 24b and is conveyed to fixing unit 11, where the toner image is fixed to recording paper 5. Recording paper 5 with the toner image fixed thereon is discharged by the discharge roller onto paper output tray. At the same time, the fact that the paper is normally discharged is detected by the paper discharge sensor.

The main controller judges the image recording operation to be normally performed, from the above detection. When this image recording operation is ended, the control is performed which prevents toner 21 on toner support 22 from jumping to control electrode 26 and dielectric belt 24 over opposing electrode 25 and adhering thereto.

By the image forming operation described above, a good image is created on recording paper 5. Since this image forming apparatus directly forms the image on recording paper 5, it is no longer necessary to use a developer medium such as photoreceptor, dielectric drum, etc., which were used in conventional image forming apparatuses.

As a result, the transfer operation for transferring the image from the developer medium to the recording paper can be omitted, thus eliminating degradation of the image and improving the reliability of the apparatus. Since the configuration of the apparatus can be simplified needing fewer parts, it is possible to reduce the apparatus in size and cost.

Although the image forming apparatus with a configuration corresponding to negatively charged toner was described in the description up to now, the polarity of voltage to be applied may be appropriately set if positive charged toner is used.

Now, consider the jumping of toner 21 from toner support 22 to opposing electrode 25 caused by the voltage application therebetween. As stated already, toner support 22 is grounded while a high voltage, i.e., 2 kV is applied to opposing electrode 25. In this condition, recording paper 5 will have a surface potential of 2 kV due to the equilibrium of the surface charges of recording paper 5.

As a result, equipotential surfaces from 0 V to 2 KV are formed at regular intervals between toner support 22 and opposing electrode 25. Opposing electrode 25 is arranged 1 mm apart from peripheral surface of toner support 22, and control electrode 26 is set up 100 $\mu$m apart from the peripheral surface of toner support 22. Therefore, the potential at the center of each gate 29 (each gate center) of control electrode 26 is set at about 200 V. Here, the potential at the center of each gate 29 will be determined by the potential difference between toner support 22 and opposing electrode 25, the geometry of control electrode 26, the shape of gates 29 . . . , etc.

Figure 6:
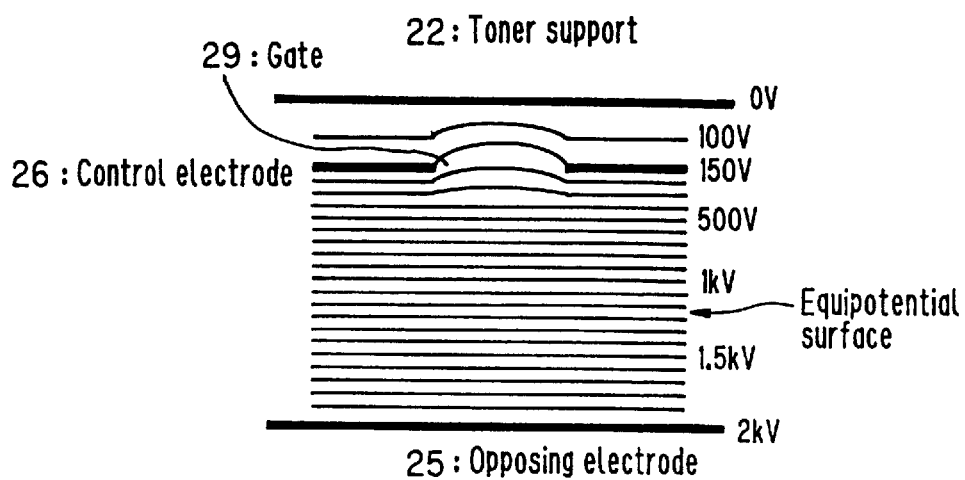
FIG. 6 is an illustrative view for illustrating the principle of the toner jumping, showing equipotential surfaces when the toner is caused to jump.

In this condition, in order for toner 21 carried on toner support 22 to pass toward opposing electrode 25, control power surface 31 is caused to apply a voltage of 150 V to annular electrodes 27 . . . of control electrode 26, for 150 $\mu$sec per pixel. When this voltage is applied, the equipotential surfaces near gate 29 of control electrode 26 change as shown in FIG. 6. More explicitly, the equipotential surfaces in the spatial region around gate 29 become curved toward toner support 22.

Figure 7:
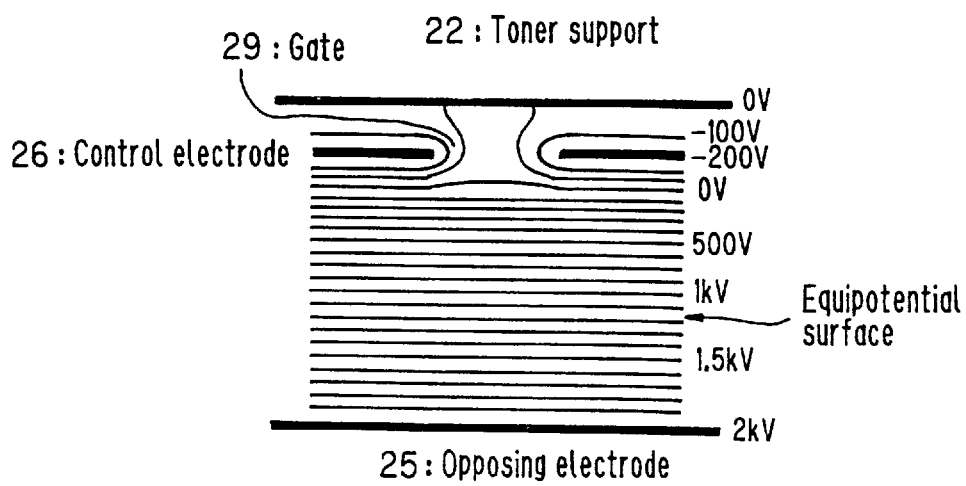
FIG. 7 is an illustrative view for illustrating the principle of the toner jumping, showing equipotential surfaces when toner jumping is stopped.

Similarly, when a voltage of −200 which will not permit toner 21 to pass through gate 29 is applied to annular electrode 27, the equipotential surface as shown in FIG. 7 is formed. In this way, the direction of the electric field between control electrode 26 and toner support 22 becomes inverted depending upon the voltage applied to control electrode 26. In FIG. 6, the electric field resides in a state which permits toner 21 carried on toner support 22 to jump toward opposing electrode 25. In FIG. 7, the electric field at gate 29 of control electrode 26 resides in a state which blocks the toner transfer or prohibits toner 21 from jumping. The equipotential surfaces shown in FIGS. 6 and 7 are those determined using computer simulation by the inventor of this application.

The electric field between control electrode 26 and opposing electrode 25, however, only varies in its intensity more or less; the direction of the field remains perpendicular to the surface of recording paper 5, constantly, or will not vary. Accordingly, the state of jumping toner 21 which is past control electrode 26 will hardly be affected by the potential state of control electrode 26.

In the above description, the voltage applied to annular electrodes 27 . . . of control electrode 26 for allowing passage of toner 21 was set at 150 V as an example. This voltage, however, is not specifically limited as long as the jumping control of toner 21 can be performed as desired. It is possible to change the extent to which the equipotential surfaces swell or curve toward toner support 22 in the vicinity of gates 29 of control electrode 26, by changing the potential applied to annular electrodes 27 of control electrode 26. Therefore, it is possible to vary the electric force acting on toner 21 passing through gates 29. This means that appropriate variation in the potential imparted from control power source 31 enables the dot size (FL) of the image formed on recording paper 5 to be adjusted arbitrarily.

The voltage to be imparted to annular electrodes 27 . . . of control electrode 26 to prevent passage of toner 21 should not be particularly limited. The above potential may be determined in practice by carrying out experiments etc.

Here, it is assumed that the image forming apparatus is able to handle six sheets of A4 sized, longitudinally set (lengthwise) recording paper 5 per min (at a rate of 6 sheets/min). In this case, the speed of recording sheet 5 over opposing electrode 25 is about 30 mm/sec. Assuming that the resolution is 300 DPI, the processing time spent for each dot in the image formed on recording paper 5, or the pulse width T (sec) applied to annular electrodes 27 . . . from control power source 31 in accordance with the image signal is shorter than about $2.8 \times 10^{-3}$ sec.

From the computation under the aforementioned various conditions and from the measurement using a high-speed camera, time t for toner 21 to jump from toner support 22 to recording paper 5 being delivered along opposing electrode 25, is known to be about 220 μsec, and time t0 for the toner to jump from toner support 22 to control electrode 26 is about 140 μsec. In the prior art, the pulse width T of the voltage applied to annular electrode 27 to cause toner 21 to jump, was set greater than transfer time t (i.e., t<T). For this reason, it was impossible to increase the recording speed because of the constraint of the time of the pulse width T.

In this invention, since in the area downstream, relative to the toner transfer, of control electrode 26, the directions of the electric field between control electrode 26 and opposing electrode 25 are the same regardless of the voltage being applied to annular electrode 27 of the control electrode as shown in FIGS. 6 and 7, toner 21, if it has already passed through control electrode 26, can continue to travel toward opposing electrode 25 to reach recording paper 5. Therefore, even if the voltage (150 V) applied to allow toner 21 to pass through gate 29 is changed to the voltage (−200 V) that prohibits toner 21 from passing through gate 29, the toner which is traveling continues to travel to reach recording paper 5 forming the image.

Figure 8:
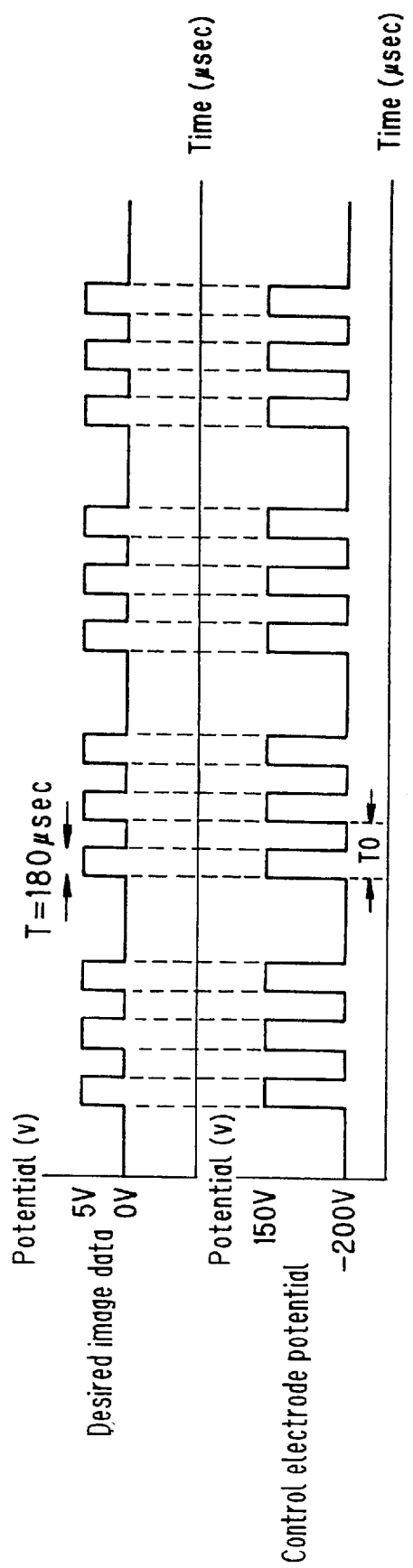
FIG. 8 is a timing chart showing the timing when a signal is applied to the control electrode.

In this embodiment, if the pulse width T of the voltage applied to annular electrode 27 of control electrode 26 for causing the toner to jump is set at 180 μsec, the jumping toner is able to reach recording paper 5 adequately. Suppose that T designates the time required for toner 21 carried on the surface of toner support 22 at the position corresponding to gate 29 to transfer, or the time (pulse width) during which the voltage imparted to control electrode 26 for causing the toner to pass through gate 29 is applied, the voltage to be applied to control electrode 26 is formed from desired image data, as shown in FIG. 8. In FIG. 8, the following relation holds between the transfer time t and the pulse width T: t=220 μsec>T=180 μsec >t0=140 μsec. Specifically, the voltage (150 V) for causing the toner to jump has been applied to annular electrode 27 of control electrode 26 for 180 μsec, then −200 V as the non-jump voltage is applied to the annular electrode.

When −200 V is applied, toner 21 which is traveling continues to travel to recording paper 5, but the toner on toner support 22 is prohibited from jumping. As a result, it is possible to shorten the time for the toner to start jumping for creating the next line. That is, since the period of time T0 for making the potential level rise to the jump voltage (150 V) can be shortened as compared to that of the prior art, it is possible to increase the recording rate in proportion to the reduction of the period T0 even if the transfer time of the toner is the same as in the prior art.

In the above configuration, an image is directly formed on recording paper 5 in correspondence with the image signal by controlling the control voltage applied to control electrode in accordance with the image signal. Control electrode 26 in this state is controlled by application of the voltage of a pulse width T, thus making it possible to reduce the transfer cycle of toner.

The invention is focused on the timing control of voltage to be applied to control electrode 26 and opposing electrode 25 at the stage prior to the foregoing image forming operation onto recording paper 5, or at the initial stage of the image forming operation.

The embodiment of the invention, specifically, the application of voltage to control electrode 26 and the application of voltage to opposing electrode 25 will be described in detail with reference to the timing chart shown in FIG. 9. According to this embodiment, before recording paper 5 is fed by pickup roller 6, image forming unit 1 is made to operate, in advance as stated above, in the following order.

First, as has been described with reference to the flowchart of FIG. 5, toner support 22 is first activated, rotating by an unillustrated driving means. Specifically, the driver motor for rotating toner support 22 is activated at time t1 in FIG. 9. This corresponds in timing to Step n7 in the control flowchart shown in FIG. 5.

Then, when a predetermined time has elapsed after toner support 22 started rotating, or when the amount of static charge on the toner carried on toner support 22 has been stabilized, the voltage (−200 V) for prohibiting toner 21 from transferring past gates 29 . . . is applied from control power source 31 to annular electrodes 27 . . . in control electrode 26. This voltage application is effected at time t2 after time ti, as shown in FIG. 9. This corresponds in timing to Step n8 in the flowchart of FIG. 5.

Thereafter, support roller 24a is activated, starting dielectric belt 24 rotating. In synchronization with the timing of the activation of the rotation, a high voltage is applied from high-voltage power source 30 to opposing electrode 25. The rotation of support roller 24a and the application of voltage to opposing electrode 25 start at time t3 in FIG. 9. This corresponds to Step n9 in the flowchart of FIG. 5.

In contrast to the timing of the above control operation, if toner support 22 starts to rotate at the same a time or after the application of voltage to annular electrode 27 . . . is performed, quite a few toner particles in the toner layer on the surface of toner support 22, do not have the desired amount of static charge. In addition, in most cases, the toner layer immediately after the start of the rotation of toner support 22 does not have the desired thickness of toner, therefore the toner layer is in an unstable state. Moreover, as long as the toner layer is unstable, there must be many reverse-charged toner particles, thus the amount of static charge will not be stabilized.

In such a toner condition, even if the voltage for prohibiting the toner from jumping is applied to annular electrodes 27 . . . , the toner particles with reverse charge or an unstable amount of static charge might reach annular electrodes 27 . . . . If in this condition, a high voltage is applied to opposing electrode 25, particles of toner 21 which have reached gates 29 on annular electrodes 27 . . . will travel to the opposing electrode.

Toner 21 which has erroneously jumped as stated above not only stains dielectric belt 24, but, in the worst case, the electric charge on toner 21 thus erroneously transferred moves to the surface of dielectric belt 24 causing an improper surface potential on the belt. For this reason, charging means 33 cannot supply to recording paper 5, the desired amount of electric charge which is produced from the potential difference between the applied potential to charging means 33 and the surface potential of dielectric belt 24. Accordingly, it becomes impossible to perform a proper electrostatic attracting operation because of the fluctuation of the amount of charge, and the recording operation itself might become unstable possibly degrading the quality of the image.

Further, if toner 21 having reached control electrode 26 adheres to it, the potential of control electrode 26 which makes toner 21 on toner support 22 either jump or not, varies due to the charge carried on toner 21, disturbing the creation of the predetermined electric field. Thus, in some cases, the control of jumping of toner 21 may become impossible. If toner 21 which has erroneously jumped, adheres to gate 29, it may become clogged with the uncontrollable toner 21, disturbing toner jumping.

Figure 9:
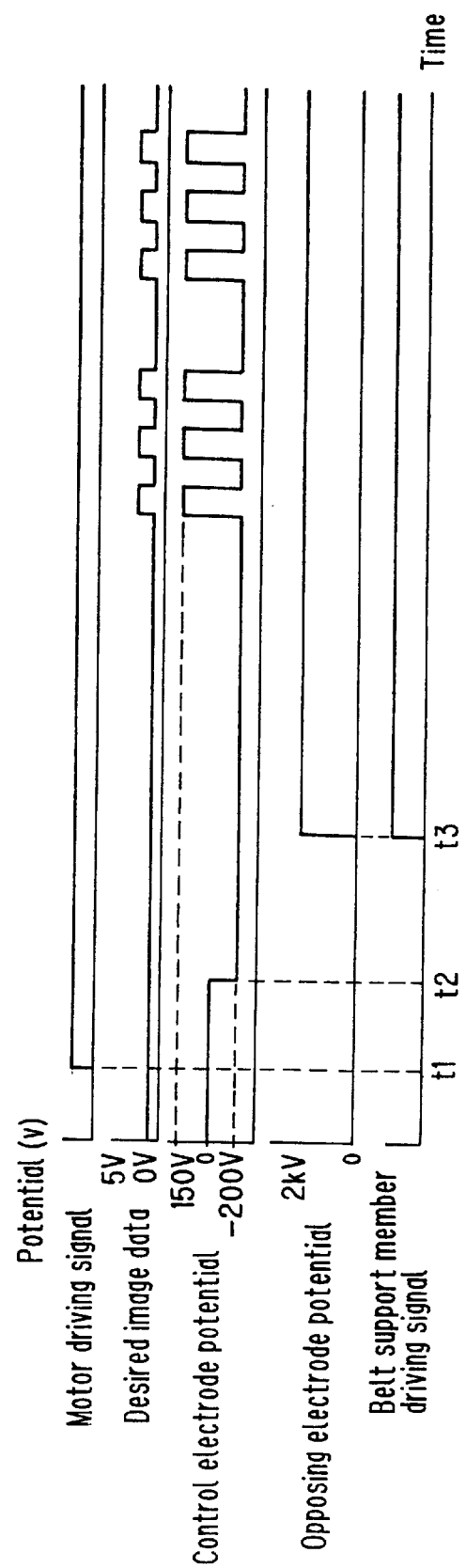
FIG. 9 is a timing chart for illustrating the timing control of the rotational operation of the toner support, the voltage application to the control electrode and the application of a high voltage to opposing electrode.

In this respect, in the case where application of voltage to control electrode 26 as well as to opposing electrode 25 is controlled at the timing of the invention shown in FIG. 9, the application of voltage to annular electrodes 27 . . . on control electrode 26 is activated after the start of the rotation of toner support 22, or specifically at time t2 when the amount of static charge on toner 21 has become stable. Then, at time t3, a high voltage is applied to opposing electrode 25. Therefore, at least around the portions of gates 29 in control electrode 26, a strong electric field will not be created while toner 21 is unstable, but will be created only after it is stabilized.

In this way, the above problem can be solved. That is, since the voltage for prohibiting the toner from jumping to control electrode 26 is applied with the amount of static charge on the toner stabilized, toner 21 carried on toner support 22 will not jump or no toner particle will transfer toward control electrode 26. Further, at this moment, toner 21 carried on toner support 22 will not jump toward opposing electrode 25 due to the application of the voltage for prohibiting the toner from jumping toward control electrode 26 because the application of the high voltage to opposing electrode 25 starts some time after the application of the predetermined voltage to control electrode 26.

Here, the stabilizing conditions of toner 21, e.g., how long it takes for toner to stabilize in its amount of static charge, will depend on the property of the toner used, the rotating speed of toner support 22, etc. Therefore, the conditions should and may be set up by an experiment beforehand or other methods. For example, suppose that toner support 22 rotates at a rate of 30 mm/sec, the time until the toner in use acquires the predetermined amount of static charge may be determined by an experiment etc., in advance so as to set the result as time (ts). Then, toner support 22 is made to rotate, the voltage for prohibiting the toner from jumping to control electrode 26 is applied after the setup time (ts), and thereafter the high voltage may be applied to opposing electrode 25.

In the above way, toner 21 is stabilized before the image forming operation. When a high voltage is applied to opposing electrode 25 after the voltage for prohibiting the toner from jumping to control electrode 26 is applied, the system judges that the previous step is over and starts the control from Step n10 in FIG. 5. When at Step n12, the image control voltage begins to be applied to control electrode 26, image forming onto recording paper 5 is commenced. In this way, the toner reaches desired positions on recording paper 5 without experiencing disturbance so that the toner image formed of dots in accordance with the image signal will be directly formed properly.

Next, the control of supplying voltages to control electrodes 26 and opposing electrode 25 as well as to toner support 22 after the end of image forming in the invention will be explained. This control is to prevent toner 21 carried on toner support 22 from adhering to control electrode 26 etc., after the end of image forming.

Figure 10:
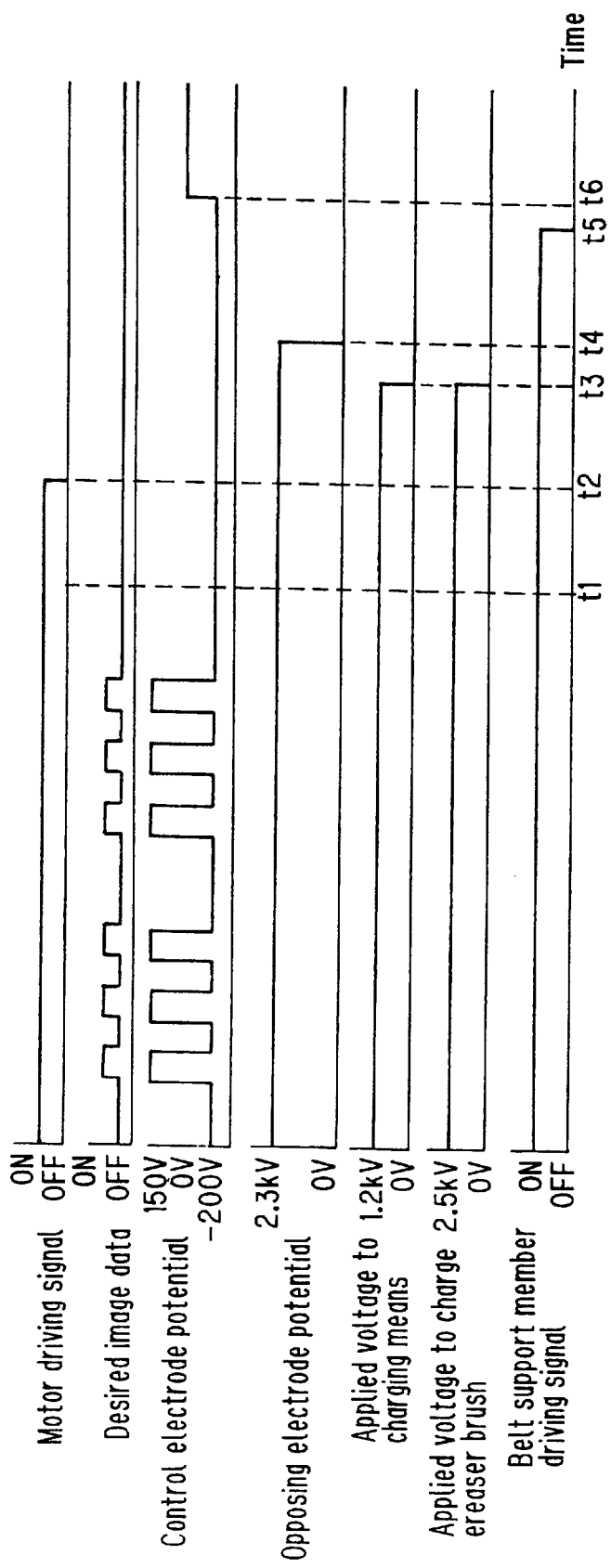
FIG. 10 is a timing chart showing the timing when a signal is applied to the control electrode of the invention.

FIG. 10 is a timing chart after the end of image forming in accordance with the invention. The control in the image forming apparatus of the invention will be described in detail with reference to FIG. 10.

In this embodiment, when the image forming operation has been completed based on the image data, the operation of toner support 22 stops first. In FIG. 10, a motor driving signal is the driving signal for rotationally driving the driver motor for toner support 22, and is first turned off. Before the deactivation of this motor, application of voltage to control electrode 26 is controlled based on the image data as shown in the time chart in FIG. 10. For example, when the image data exists or when a dot is to be created, the output of the image data is made 'on'. Based on this data, the toner jump voltage, 150 V is selectively applied to control electrode 26, especially to annular electrodes 27.

When the image forming operation finishes, the end of operation is confirmed and toner support 22 is stopped rotating as stated above, at time t2 after time t1 in the timing chart shown in FIG. 10. Thereafter, at time t3, the voltage supplied to charging means 33 is shut down to ground level (0 V). By this operation, the surface of dielectric belt 24 is supplied with negative charge so that the surface potential of dielectric belt 24 becomes close to 0 V. At this moment, the voltage supplied to a charge eraser brush 32 for eliminating the charge on dielectric belt 24 is also connected to the ground level. This is done to uniformly erase static charge on dielectric belt 24.

In this state, dielectric belt 24 continues to rotate. After at least one turn or uniformly easing charge on the whole peripheral surface, a voltage applied to opposing electrode 25 is shut down or grounded at time t4. In this condition, dielectric belt 24 continues to turn to make further one revolution, so that the surface potential on dielectric belt 24 will become at 0 V throughout the peripheral surface.

After application of high voltage to opposing electrode 25 is shut down and grounded, dielectric belt 24 turns at least one revolution so that the whole part of it is charge-erased or the potential set at approximately "0 V". When this is done, dielectric belt 24 stops driving at time t5. This stoppage is made by stopping the rotation of support roller 24b supporting dielectric belt 24. The stoppage of support roller 24b means the stoppage of feed of recording paper 5 as well as the stoppage of dielectric belt 24 and further the shutdown of transmission of rotational force from the driving motor in the conveying system which is in link with the fixing unit, etc.

Then, when dielectric belt 24 has stopped moving, the voltage supplied to control electrode 26 is finally deactivated at time t6. At time t1 when the image forming operation is ended, a voltage (e.g., -200 V in this embodiment) for prohibiting toner 21 on toner support 22 from jumping toward opposing electrode 25 is applied to the control electrode 26 and continues being kept at that level. The voltage applied to control electrode 26 is finally deactivated so that control electrode 26, especially annular electrodes 27 is grounded.

Power source circuit 17, 18 and 30 and power control circuit 31, which supply predetermined voltages to charging means 33, opposing electrode 25 and control electrode 26 are configured so that these components will be grounded when the supply voltages are shut down. That is to say, output terminals of these circuits are grounded when the supply voltages are shut down.

In this way, in the present invention, the system is controlled so that first the operation of toner support 22 stops, then the electric field for making the toner jump from toner support 22 and opposing electrode 25 is deactivated, thereafter the electric field which is generated between toner support 22 and control electrode 26 for controlling the toner transfer state, is canceled.

In contrast, in the conventional configuration, high voltages supplied to electrodes 25 and 26 are turned off simultaneously by a single trigger, but the outputs from the high-voltage power sources do not become 0 V at the same time. Generally, it takes longer time for the output potential to fall as the applied voltage is higher. In this case, if for example, the potential of control electrode 26 becomes 0 V, the potential of opposing electrode 25 does not drop to zero, but still has a potential which causes attractive force acting on toner 21 thereto. This period of time is very short, but some particles of toner 21 start jumping toward opposing electrode 25, reaching opposing electrode 25 or control electrode 26. These toner will be termed 'mal-transfer toner' hereinbelow.

For the above reason, the mal-transfer toner adheres to the surface of opposing electrode 25, staining it, especially the surface of dielectric belt 24 which travels whilst being in close contact with the top face of opposing electrode 25. If the image forming operation is restarted in this condition and recording paper 5 is fed and conveyed, the underside of recording paper 5 is stained with the mal-transfer toner. Further, due to static charge on the mal-transfer toner, the apparent potential on opposing electrode 25 relative to that of the toner 21 existing on the surface of toner support 22 varies. Specifically, the potential of opposing electrode 25 tends to vary in such a way that toner 21 may become unlikely to jump. Thus it becomes impossible to obtain a necessary and sufficient electric field for toner jumping. This variation of the electric field due to the mal-transfer toner causes an insufficiency of toner 21 transferring to the areas onto which the mal-transfer toner had adhered. This means that the failure of toner 21 to sufficiently transfer to the surface of recording paper 5 corresponding to the areas to which the mal-transfer toner is adhering, thus causing reduction in image density and printing defects. In the worst case, toner 21 may not jump, causing printing to be disabled.

The supplying and cutoff of the high voltages is not changed over by means of a relay circuit etc., but the cutoff operation is effected by turning off the high-voltage power source itself. This feature further lengthens the decay time constant, thus promoting the aforementioned problem.

When toner 21 is adhering to gates 29 of control electrode 26, the openings of gates 29 become narrowed because the toner adheres to the interior of gates 29. If the image forming operation is started in this condition, the toner adhering to the interior of gates 29 disturbs jumping toner 21 traveling along the desired transfer path. In such a case, it becomes impossible to predict the jumping path of toner 21 or it is impossible to control the landing point of it. Therefore, jumping toner 21 does not always reach the designated dot creating areas on recording paper 5, but possibly reaching outside the dot creating areas. The toner particles having arrived outside the dot creating areas creates a scatter or fogginess around dots. That is, the dots becomes blurred and unclear and low in contrast, thus degrading the resultant image. Accordingly, it is, needless to say, impossible to create a desired sharp image. Further, dots cannot be formed in the specified density and size, causing difficulty in reproducing a halftone image or color image.

Further, due to static charge on the toner adhering to the interior of gates 29, the apparent potential on control electrode 26 relative to that of the toner existing on toner support 22 varies. Specifically, the potential of control electrode 26 tends to vary in such a way as to become close to the voltage for inhibiting the toner from jumping. Therefore, this further makes it difficult for the toner to jump. Accordingly, even if a voltage for causing the toner to jump is applied to control electrode 26, toner 21 on toner support 22 does not receive attraction by the electric field for jump and can not jump. In this condition, the image forming operation cannot be performed properly, casing print failure or partial image defects.

If toner 21 is caused to jump in this condition, the toner is unpredictable and uncontrollable because the geometric feature of equipotential surfaces in the vicinity of gates 29 deviates from the predetermined one due the potential generated by the charge carried on toner 21 adhering to control electrode 26 or the interior of gates 29 and because this geometric shape is easy to vary depending upon the adhering state of toner 21. Thus, it is impossible to predict the jumping path of toner 21 or it is impossible to control the landing point of it. Therefore, jumping toner 21 does not always reach the designated dot creating areas on recording paper 5, but possibly reaching outside the dot creating areas. The toner particles having arrived outside the dot creating areas creates a scatter or fogginess around dots. That is, the dots on recording paper 5 form a degraded, dim and blurred image without contrast. As a result, it is, needless to say, impossible to create a desired sharp image. Further, dots cannot be formed in the specified density and size, causing difficulty in reproducing a halftone image or color image.

Furthermore, if the amount of the toner adhering further increases, gates 29 will become clogged with mal-transfer toner particles, causing the image forming operation to become physically impossible in the worst case.

Moreover, if the image forming apparatus has been left as it was at the end of the last image forming operation, toner 21 adhering to control electrode 26 will clump. Once this happened, it is impossible to remove the toner adhering by electrostatic force, without a forced removal means. For example, control electrode 26 may be detached, and the clumping toner is removed using a cleaning means such as an air brush, typical cleaning brush, etc. Since control electrode 26, in particular, is very thin and easy to damage, extra problems occur such as that control electrode 26 is damaged, deformed or broken when the toner is removed by the cleaning means. Further, the electrode might be attached at a somewhat offset position after cleaning.

In contrast, in accordance with the invention, as was described with reference to the time chart in FIG. 10, after the end of the image forming operation, the operation of toner support 22, in particular, its rotation is first stopped so that the speed of toner 21, including its vibration is set to be zero. Toner 21 is conveyed to the image forming region in printing section 3 with being carried on toner support 22. Whilst toner 21 being conveyed, the attaching force of toner 21 to toner support 22 is weakened.

Therefore, the rotation of toner support 22 is stopped or the conveying speed or moving speed of toner 21 itself is set at zero at time t2 after time t1 at which the end of the image forming operation was detected. In this way, the conveyance of toner 21 is stopped so that the attractive force acting on toner 21 to toner support 22 is enhanced. That is, extra force acting on toner 21 toward toner support 22 is imparted. Here, in order to nullify the conveyance of toner 21, the rotation of toner support 22 is adapted to stop. Other than this method, it is also possible to nullify the amount of the toner adhering using doctor blade 23 which is originally used to regulate the amount of the toner adhering to toner support 22. Moreover, a shutter or other means may be provided separately from doctor blade 23, so that a controlled amount of toner is supplied to toner support 22 and then the toner supplied to toner support 22 is shut down with the shutter in order to nullify the conveyance of toner 21.

As stated above, after the operation of toner support 22 was stopped, the electric field which has been generated between toner support 22 and opposing electrode 25 for causing the toner to jump is canceled at time t4. When the electrode is grounded after the stop of supplying high voltage to opposing electrode 25, the potential of it gradually decreases to the ground level '0' with a decay time constant. At this moment, because, as shown in FIG. 10, after the end of image forming operation, control electrode 26 has been kept at the voltage for prohibiting toner 21 from jumping, toner 21 on toner support 22 can be prohibited from jumping.

Then, only when the potential of opposing electrode 25 becomes stabilized to the ground level after switching the application of voltage to opposing electrode 25 into the ground level, application of the voltage for prohibiting the toner from jumping to control electrode 26 is canceled at time t6. This sequence of voltage application restrains toner 21 from jumping from toner support 22. Thus, it becomes possible to evade all the conventional problems described above. Further, since the application of voltages to opposing electrode 25 and control electrode 26 is canceled, it is possible to reduce the power consumption after the image forming operation.

In FIG. 10, the time lag between the motor driving signal and the application of voltage to control electrode 26, and the control time lag between the application of high voltage to opposing electrode 25 and that to charging means 33, become different depending on the characteristic of the apparatus, but it is should not be particularly limited as long as toner 21 can be restrained on toner support 22. That is, before the cancellation of supplying voltage to control electrode 26, the electric field for causing the toner to jump to opposing electrode 25 should be canceled optimally.

Figure 11:
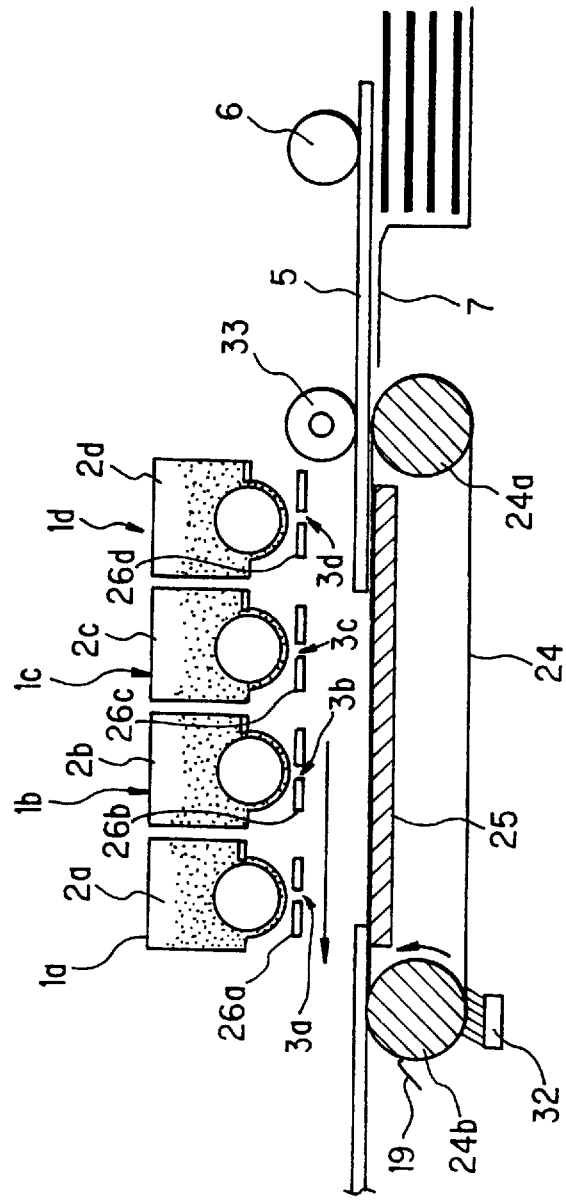
FIG. 11 is a sectional view showing essential components for color image forming in an image forming apparatus of the invention.

In accordance with the embodiment described above, a monochrome image forming apparatus was illustrated. The present invention can also be applied to color image forming apparatuses with high effectiveness. As an example shown in FIG. 11, a color image forming apparatus with a plurality of image forming units 1a, 1b, 1c and 1d made up of toner supplying sections 2a, 2b, 2c and 2d and printing sections 3a, 3b, 3c and 3d, is configured where toner supplying sections 2a, 2b, 2c and 2d are filled with color toners, i.e., yellow, magenta, cyan and black, respectively.

In FIG. 10, image forming units 1a, 1b 1c and 1d corresponding to yellow, magenta, cyan and black are arranged with respective control electrodes 26a, 26b, 26c and 26d so that the voltages applied to the control electrodes are controlled in accordance with the color image data so to create color images. The other components are the same as those in FIG. 3. In particular, opposing electrode 25 is used in common for all the image forming units.

In accordance with this color image forming apparatus, if the above-described problem occurs, staining of dielectric belt 24 with color toners simply becomes four times as much as that in the monochrome type apparatus, that is, the above problem becomes more critical in the color configuration. However, the control of this invention can eliminate the problem, efficiently contributing to the color type configuration.

Figure 4:
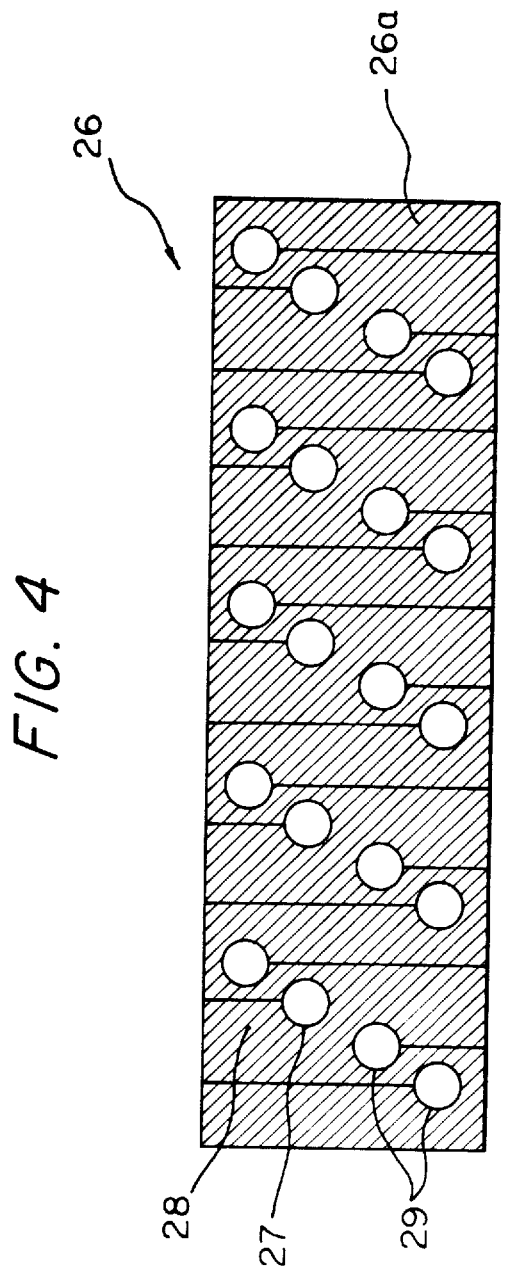
FIG. 4 is a plan view showing a detailed partial structure of the control electrode provided in the image forming apparatus of the invention.
Figure 12:
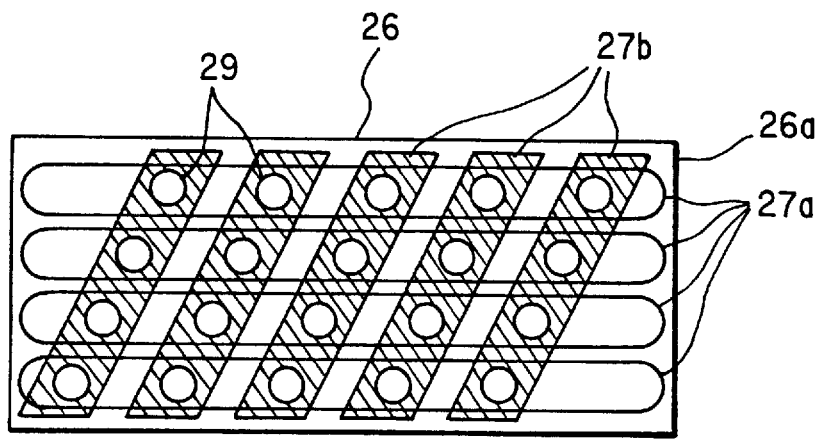
FIG. 12 is a plan view showing another embodiment of a control electrode of the invention, wherein the control electrode has a matrix structure.

In the above description of the embodiment, a single drive control electrode as shown in FIG. 4 was explained as control electrode 26. It is also possible to use a control electrode in a matrix drive form as shown in FIG. 12. Since the matrix drive type can markedly reduce the number of drives required, this feature contributes to reduction in cost.

As shown in FIG. 12, a control electrode 26 has strip-like electrode groups 27a and 27b on the front and rear surfaces of a board 26a, crossing over each other at right angles or at an angle. Gates 29 for allowing the toner flow to pass therethrough are formed at positions where front-side strip-like electrodes 27a cross the opposing side strip-like electrodes 27b.

As an example, the toner jump voltage in accordance with the image signal is applied to front-side strip-like electrode group 27a, while the toner jump voltage in accordance with the scan signal which periodically changes is applied to rear-side strip-like electrode group 27b. When the toner jump voltage is applied simultaneously to front and rear side sprit-like electrode groups 27a and 27b, gates 29 where the front and rear side electrodes cross over each other, cause toner 21 on toner support 22 to jump, and thus the toner travels past the selected gates 29 toward opposing electrode 25.

In the thus configured control electrode 26, the same effects as described in the foregoing embodiment can be obtained. Specifically, toner support 22 first starts to be rotated. When the amount of static charge on the toner supported becomes stabilized, each of strip-like electrode groups 27a and 27b on control electrode 26 is supplied with a non-jump voltage, and thereafter a high voltage should be applied to opposing electrode 25.

In the thus configured control electrode 26, when the electrode group on the side facing opposing electrode 25 is controlled as stated above, the same effects as described for the foregoing case can be obtained. Specifically, the high voltage applied to opposing electrode 25 is canceled after the end of image forming. Then the non-jump voltage being applied to strip-like control groups 27a and 27b should be changed to the ground level.

In the description of the embodiment, the example where the toner is used as the developer particles was explained, but ink or other material can be used as the developer particles. It is also possible to construct toner supplying section 2 with a structure using an ion flow process. Specifically, image forming unit 1 may includes an ion source such a corona charger or the like. Also in this case, it is possible to have the same effect as stated above.

The image forming apparatus in accordance with the invention can be preferably applied to the printing unit in digital copiers, facsimile machines as well as to digital printers, plotters, etc.

As has been described, the image forming apparatus at the initial stage of the recording start, in particular before image forming onto the recording paper, a developer support carrying developer particles is operated so as to stabilize the developer particles. After the developer particles become stabilized, a voltage for controlling the jumping of developer particles is applied to a control electrode. Therefore the developer particles, e.g. toner, on the developer support can be prevented from erroneously jumping. It is also possible to solve the problem such as adherence of the toner to the control electrode. As a result, the electric field generated between the control electrode and the developer support will not be varied due to adherence of charged toner, nor will a clog occur at the gates formed on the control electrode, either.

Since a high voltage is applied to the opposing electrode after the control electrode was applied with the voltage for prohibiting the developer particles from passing through it, no developer particles will erroneously jump through the control electrode when a strong electric field is generated. In particular, since no developer particle, e.g. toner does adhere to the control electrodes, no toner will jump toward the opposing electrode. Thus, the recording paper as a recording medium can be prevented from being stained.

Further, when, after the developer particles have been stabilized, the aforementioned voltage application to the control electrode is performed and then a high voltage is applied to the opposing electrode, no developer particles on the developer support will erroneously transfer to the opposing electrode.

As a result, after the start of recording onto the recording paper, the recording paper can be prevented from being stained with developer particles, e.g., toner. Further, the toner can, as being affected by the process of the electric field in the normal condition, reach and adhere to the designated position on the recording paper, forming a good recording image.

As has been described hereinabove, the image forming apparatus can inhibit the developer particles from jumping after the end of the image forming operation. In particular, when the developer particle is in the form of toner, for example, the toner would jump and stain the control electrode and opposing electrode, causing a various problems. The configuration of the present invention can eliminate occurrence of these problems and perform stable image forming. In this case, the power supply to the opposing electrode and control electrode at the end of the image forming operation, is stopped. This operation not only prevents unnecessary toner from jumping, but also is able to reduce the power consumption.

Particularly, the toner can be reliably prevented from jumping by stopping the developer support for supporting toner after the end of image forming operation, canceling supplying of high voltage to the opposing electrode and then canceling the non-jump voltage applied to the control electrode.

What is claimed is:

1. An image forming apparatus comprising:
   a supporting means for supporting developer particles and imparting desired characteristics to the developer particles;
   an opposing electrode disposed facing the supporting means;
   a control electrode disposed between the supporting means and the opposing electrode and having a plurality of gates which form passage for the developer particles; and
   a controlling means which generates a predetermined potential difference between the supporting means and the opposing electrode and, by varying the potential applied to the control electrode, controls passage of the gates for the developer particles forming the image,
wherein at the start of an image forming operation, the controlling means suspends the application of a voltage to at least the control electrode until the developer particles carried on the supporting means for supporting the developer particles become imparted with desired characteristics, and applies a voltage for prohibiting the developer particles carried on the supporting means from jumping to the control electrode, only after the desired characteristics are given to the developer.

2. An image forming apparatus comprising:
   a supporting means for supporting developer particles and imparting desired characteristics to the developer particles;
   an opposing electrode disposed facing the supporting means;
   a control electrode disposed between the supporting means and the opposing electrode and having a plurality of gates which form passage for the developer particles; and
   a controlling means which generates a predetermined potential difference between the supporting means and the opposing electrode and, by varying the potential applied to the control electrode, controls passage of the gates for the developer particles forming the image on a recording medium conveyed along a top face of the opposing electrode,
wherein an image forming operation onto the recording medium is started in such a manner that, at the start of the image forming operation, the controlling means, after it applies a voltage for prohibiting the developer particles carried on the supporting means from jumping, to the control electrode, applies a high voltage to the opposing electrode, then applies voltages in accordance with the image signal, to the control electrode.

3. An image forming apparatus comprising:
   a supporting means for supporting developer particles and imparting desired characteristics to the developer particles;
   an opposing electrode disposed facing the supporting means;
   a control electrode disposed between the supporting means and the opposing electrode and having a plurality of gates which form passage for the developer particles; and
   a controlling means which generates a predetermined potential difference between the supporting means and the opposing electrode and, by varying the potential applied to the control electrode, controls passage of the gates for the developer particles forming the image on a recording medium conveyed along a top face of the opposing electrode,
wherein at the start of an image forming operation, the controlling means suspends the application of a voltage to the control electrode until the developer particles carried on the supporting means for supporting the developer particles become imparted with desired characteristics, and applies a voltage for prohibiting the developer particles carried on the supporting means from jumping to the control electrode, only after the desired characteristics are given to the developer, thereafter applies a high voltage to the opposing electrode, then applies voltages in accordance with the image signal, to the control electrode.

4. An image forming apparatus comprising:
   a supporting means for supporting developer particles and imparting desired characteristics to the developer particles;
   an opposing electrode disposed facing the supporting means;
   a control electrode disposed between the supporting means and the opposing electrode and having a plurality of gates which form passage for the developer particles; and
   a controlling means which generates a predetermined potential difference between the supporting means and the opposing electrode and, by varying the potential applied to the control electrode, controls passage of the gates for the developer particles forming the image,
wherein at the end of an image forming operation, before Ha the controlling means cancels the conditions on which the developer particles are prohibited from jumping in the developing region, a speed at which the supporting means or the developer particles are moved is set to be zero.

5. An image forming apparatus according to claim 4, wherein the controlling means, after the moving speed imparted to the supporting means or the developer particles has been set at zero, cancels a jump electric field generated between the supporting means and the opposing electrode.

6. An image forming apparatus according to claim 5, wherein the controlling means, after the jump electric field generated between the supporting means and the opposing electrode has been canceled, cancels the voltage imparted to the control electrode.

* * * * *